(12) United States Patent
Greer, IV

(10) Patent No.: US 6,504,982 B1
(45) Date of Patent: Jan. 7, 2003

(54) INCORPORATION OF UV TRANSPARENT PERLESCENT PIGMENTS TO UV CURABLE OPTICAL FIBER MATERIALS

(75) Inventor: Robert W. Greer, IV, Conover, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/343,050

(22) Filed: Jun. 30, 1999

(51) Int. Cl.[7] ............................... G02B 6/16; G02B 6/44
(52) U.S. Cl. ....................... 385/128; 385/126; 385/102; 385/141; 385/114
(58) Field of Search .................... 385/123, 124, 385/126, 127, 128, 141, 142, 143, 144, 145, 114, 102, 103; 522/64, 75, 78, 81, 122; 428/344, 373, 378

(56) References Cited

U.S. PATENT DOCUMENTS

| | | | |
|---|---|---|---|
| 4,465,797 A | * | 8/1984 | Brownscombe et al. .... 523/216 |
| 4,741,778 A | * | 5/1988 | Horie et al. ........... 106/287.16 |
| 5,146,529 A | * | 9/1992 | Mizutani .................... 385/103 |
| 5,259,060 A | | 11/1993 | Edward et al. ............. 385/128 |
| 5,354,348 A | | 10/1994 | Zushi et al. ................... 65/423 |
| 5,933,559 A | * | 8/1999 | Petisce ........................ 385/114 |
| 6,026,207 A | * | 2/2000 | Reddy et al. ............... 385/128 |
| 6,040,357 A | * | 3/2000 | Murphy et al. ............. 385/123 |
| 6,113,683 A | * | 9/2000 | Herrene et al. ............. 106/494 |
| 6,130,980 A | * | 10/2000 | Murphy et al. ............. 385/115 |

FOREIGN PATENT DOCUMENTS

| | | |
|---|---|---|
| DE | 199 24 381 A1 | 12/1999 |
| EP | 0 582 833 A1 | 7/1993 |
| WO | WO 98/56850 | 12/1988 |

OTHER PUBLICATIONS

Photoinitiation, Photopolymerization & Photocuring by Jean–Pierre Fouassier, Published in 1995 by Hanser Publishers, New York, pp. 285–293.

* cited by examiner

Primary Examiner—Hemang Sanghavi
(74) Attorney, Agent, or Firm—Sughrue Mion, PLLC

(57) ABSTRACT

An optical fiber containing a polymer coating that includes a perlescent pigment. The perlescent pigment contains mica particles which transmit wavelengths of light used to cure the polymer coating. Further, the mica particles reflect visible wavelengths of light. Therefore, the inclusion of perlescent pigments in the polymer coating increases cure speed, due to increased UV transmittance, while enhancing the brightness or visibility of color in an optical fiber coating, due to reflection of visible light.

20 Claims, 2 Drawing Sheets

INCORPORATION OF UV TRANSPARENT PERLESCENT PIGMENTS TO UV CURABLE OPTICAL FIBER MATERIALS

BACKGROUND OF THE INVENTION

1. Field of the Invention

The present invention relates to coated optical fibers and, more specifically, to an improved manner of color coding the coated optical fibers wherein the manner of color coding also produces faster cure speeds in the optical fiber coating.

2. Related Art

Traditionally, the pigments used to color code optical fibers block light. Because the traditional pigments block light, a low amount of ultraviolet (UV) radiation is allowed to pass through the coating containing the traditional pigments. The amount of UV radiation allowed to pass through the pigment containing layer directly affects cure time of the pigment containing layer as well as any other curable layers underneath thereof. Therefore, the use of traditional pigments is an impediment to increased curing time of optical fiber coatings.

U.S. Pat. No. 5,259,060 to Edward et al. discloses a coated optical fiber which includes an ink layer, and a layer containing an opaque white pigmented layer. The opaque white layer includes sufficient white pigment to render it light-reflective and substantially opaque to visible light. However, the pigments used to produce the opaque white layer are traditional pigments which block UV radiation and, therefore, are an impediment to faster curing speeds.

SUMMARY OF THE INVENTION

An object of the present invention is to overcome the disadvantages of the prior art. More specifically, an object of the present invention is to increase cure speed of optical fiber coatings while maintaining easily identifiable color coding. A further object is to increase cure speed of optical fiber coatings while enhancing the brightness, or visibility, of the colors in an optical fiber coating.

In the present invention, a perlescent pigment is used in the polymer coating materials of an optical fiber to achieve easy color identification of the optical fiber, as well as to achieve an increased amount of UV transmissibility which thereby produces faster curing speeds. The present invention is of particular importance when the optical fiber contains a hermetic coating. The hermetic coating acts to protect the fiber from the potentially harmful effects of water vapor or gaseous contaminants affecting optical transmission characteristics or fiber strength. The hermetic coating is typically a metallic or carbon-based coating which tends to absorb light and present a dark background. Therefore, when present, the hermetic coating makes effective color coding even more difficult.

An important fact is that, due to the size and geometry of the fibers, much of the apparent brightness or color intensity in polymer fiber coatings is derived from light which is transmitted or reflected through the polymer matrix wherein the colorant resides. This includes a substantial light component traversing the coating which would normally be reflected from the surface of the fiber itself, but for the presence of the hermetic coating thereon.

Increasing the proportion of light transmitted through the coating is achieved in accordance with the invention by minimizing or avoiding the inclusion of additional opacifying agents in the pigmented layer, i.e., substituting a perlescent pigment material for the traditional pigments used for coloring optical fiber coatings. A perlescent pigment is used in the same coating as the colored pigments, or in a layer under the pigmented layer, to thereby increase the amount of light impinging on the colored pigment. By increasing the amount of light impinging on the colored pigments, the brightness or visibility of the pigment present in the colored layers is intensified.

Another important fact is that traditional pigments block UV radiation which is necessary to cure the polymers in and under the layer containing the pigments. Therefore, replacing a portion of the traditional pigments with perlescent pigments, which block significantly less radiation at wavelengths below about 400 nm, reduces the amount of UV radiation which is blocked. Because a decreased amount of UV radiation is blocked, more UV radiation is transmitted to cure the underlying polymer which, in turn, increases the curing speed. The perlescent pigment may include, for example, mica particles, mica particles coated with a pigment, fish scales, or any other type of particle that gives a metallic-looking finish to the polymer in which it is disposed.

In one embodiment, the perlescent pigment is made of mica particles. Mica particles are more transparent to UV radiation below about 400 nm, whereas wavelengths of about 250 to about 400 nm are used to cure the polymer coatings. Thus, the mica particles transmit more of the UV radiation wavelengths used for curing the polymer coating. Further, mica particles reflect light above about 420 nm, including light in the visible range and, therefore, enhance the brightness or visibility of color for fiber identification. Thus, the mica particles allow the underlying polymer coatings to be cured at a fast rate while at the same time producing an enhanced, easily identifiable, color in the optical fiber.

The average width of the mica particles may range from 1 $\mu$m to the order of thickness of the coating in which they are contained. For example, when the thickness of the coating is on the order of 15 $\mu$m, particles having an average width larger than 15 $\mu$m would not work well. Preferably, the average width of the mica particles is from 1 $\mu$m to 10 $\mu$m which produces good results without producing additional stress on the fiber core, and without clogging the dies with which the optical fiber is produced. Most preferably, the average width of the mica particles is 8 $\mu$m.

The mica particles may be coated with a form of titanium oxide ($TiO_2$) to produce a "white" color. Two forms of $TiO_2$ which work well, in particular, are rutile and anatase. A "white" perlescent pigment is useful in reflecting light to enhance the brightness and visibility of other colored pigments. Further, when used alone, the perlescent pigment produces an easily identifiable "white" colored fiber.

The composition of the polymers used in the optical fiber coatings in accordance with the present invention is not critical. Any of the well-known curable liquid polymers known to have utility for the application of optical fiber coatings may be employed. Examples of some well-known polymer types which have previously been used for protective and/or colored optical fiber coatings include urea-acrylate, urethane-acrylate, epoxy-acrylate, polyether acrylate, polyester acrylate, urethane epoxides, silicone acrylates, and silicone polymers. Either thermally curable or radiation curable forms of these coatings may be used. The polymer used to coat the optical fibers may be a UV curable polymer, an electron beam curable polymer, or any other suitable polymer. However, the perlescent pigments of the present invention are particularly useful with UV curable polymers. Therefore, the specification describes the present invention in connection with optical fiber coatings made of UV curable polymers, with the understanding that the polymer may be of any suitable type.

BRIEF DESCRIPTION OF THE DRAWINGS

The above and other objects and advantages of the present invention will become more apparent by describing in detail preferred embodiments thereof with reference to the accompanying drawings, wherein.

DETAILED DESCRIPTION OF THE INVENTION

Figure 1:
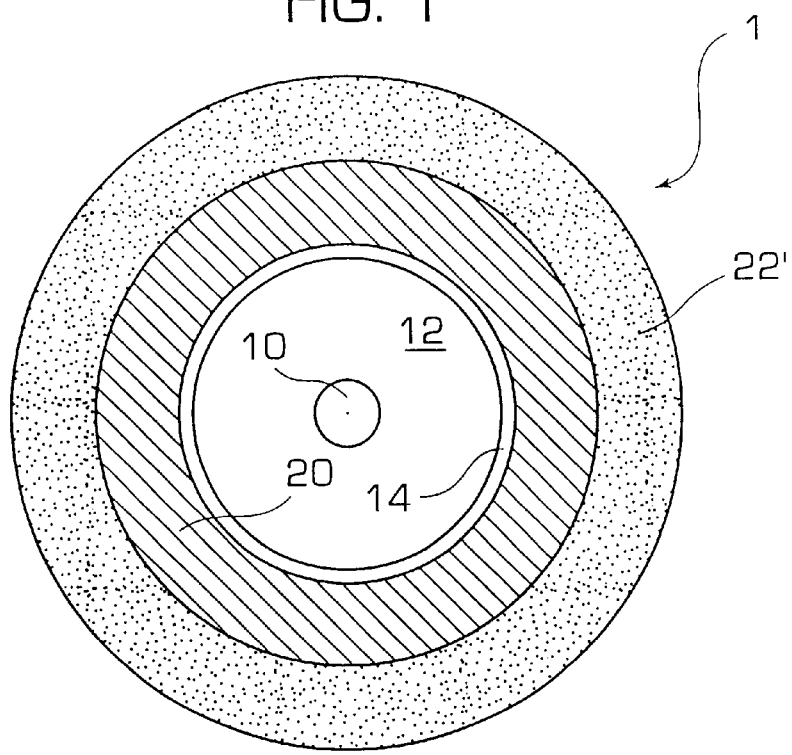
FIG. 1 is a schematic cross-sectional view of an optical fiber according to one embodiment of the present invention.
Figure 2:
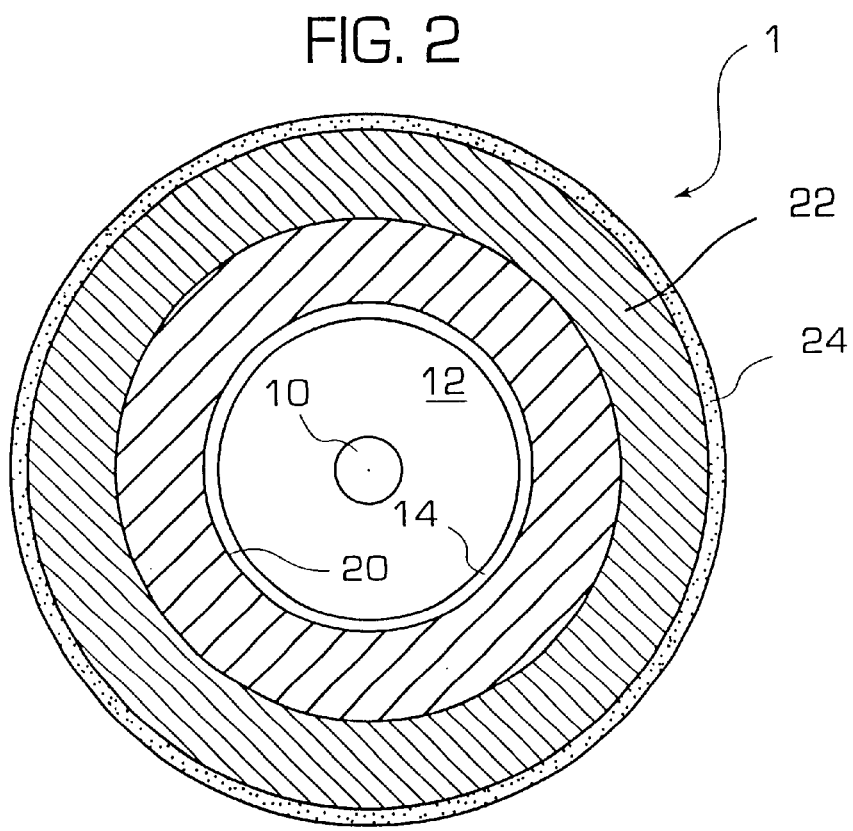
FIG. 2 is a schematic cross-sectional view of an optical fiber according to a second embodiment of the present invention.

As shown in FIGS. 1 and 2, an optical fiber 1 includes a core 10, a cladding 12, a primary coating 20 and a secondary coating 22. Further, the optical fiber may contain a hermetic coating 14 and/or an ink layer 24. The primary coating 20 and secondary coating 22 are made of a UV curable polymer.

FIG. 1 shows a secondary coating 22' containing a perlescent pigment. The perlescent pigment may be, for example, either mica particles, or mica particles coated with a pigment and, in particular, coated with a form of $TiO_2$. When the secondary coating 22' contains only the perlescent pigment coated with a form of $TiO_2$, a "white" colored fiber is produced. Alternatively, the secondary coating 22' may also contain other pigments which correspond to other colors for identification. By including the "white" perlescent pigment along with other colored pigments, the visibility of the other colored pigments is enhanced. Further, by including the "white" perlescent pigment and colored pigment in the same coating layer, with the "white" perlescent pigment replacing a portion of the colored pigment, the UV transmittability of the colored coating is enhanced, thereby producing a faster cure speed.

Instead of including a perlescent pigment in the secondary coating 22, the perlescent pigment may be included in a different coating of the optical fiber, but still have the same advantages as described in connection with the optical fiber of FIG. 1. For example, as shown in FIG. 2, some optical fibers may contain an ink layer 24 which surrounds the secondary coating 22. In this type of fiber, colored pigments are not contained in either the primary coating 20 or the secondary coating 22 but, instead, are included in the separate ink layer 24. In this case, a perlescent pigment may be added to any one, or more, of the secondary coating 22, and the ink layer 24.

When the perlescent pigment is included in the secondary coating 22, it enhances the visibility of the colored pigment in the ink layer 24. The visibility of the pigment in the ink layer is enhanced due to light which is reflected by the perlescent pigment in the secondary coating 24. Also, because the perlescent pigment does not block as much UV light used for curing, the cure time is not adversely affected by the inclusion of the perlescent pigment.

When the perlescent pigment is included in the ink layer 24, it enhances the visibility of the colored pigment as well as produces a faster cure speed. Because the perlescent pigment reflects light in the visible range, it brightens, or enhances the visibility of, the colored pigments. Also, because the perlescent pigment replaces some of the colored pigment in the ink layer 24, there is less pigment which blocks the UV radiation used in curing. Further, because the perlescent pigment, which replaces the colored pigment, transmits UV radiation used in curing, the cure speed is increased.

Figure 3:
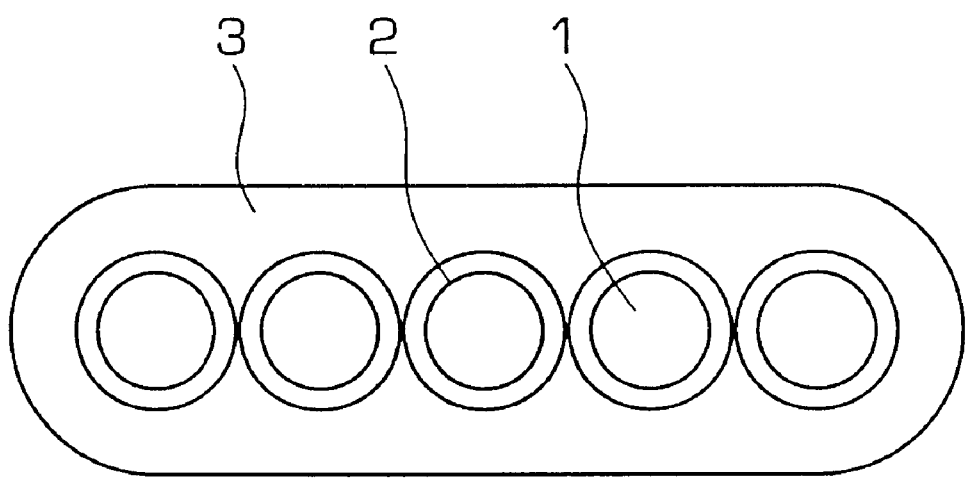
FIG. 3 is a schematic cross-sectional view of a fiber optic ribbon according to the present invention.

In an alternative embodiment, the perlescent pigment of the present invention may be used in a fiber optic ribbon. FIG. 3 shows a fiber optic ribbon which includes optical fibers I disposed in a matrix material 3. For simplicity, the optical fibers 1 as shown in FIG. 4 include a coating 2. The optical fibers 1 may be any of the types shown in FIGS. 1–2, or any other suitable type. Accordingly, the coating 2 may include: the primary coating 20 and the secondary coating 22; or the primary coating 20, the secondary coating 22, and the ink layer 24. Alternatively, the coating 2 may be the only coating on the optical fiber. In the fiber optic ribbon, the matrix material 3 is made of a polymer material, similar to the polymer material of the optical fiber coating, and may include pigments therein so that different fiber optic ribbons can be identified. In the present invention, perlescent pigments are included in the matrix material 3 of a fiber optic ribbon. Perlescent pigments in the matrix material enhance the brightness, or visibility of, colored pigments in the matrix material, thereby facilitating identification of different fiber optic ribbons. Further, because of the UV transmittability of the perlescent pigments, the cure speed of the matrix material is increased.

Instead of colored "pigments", any of the above polymer materials may include "dyes". Suitable "dyes" are described in U.S. Pat. No. 5,074,643 to Petisce which is incorporated herein by reference. The "dyes" are incapable of producing a "white" color. However, the perlescent pigments of the present invention, when used without any other colored pigment or dye, can be used to generate a "white" color. In order to produce a "white" color, the mica particles—or other particles which give a metallic-looking finish—may be used without any coating thereon. Alternatively, to enhance the "white" color, the mica particles may be coated with a form of $TiO_2$ and, in particular, a rutile or anatase.

Further, the perlescent pigments may be used in a coating along with the "dyes" to thereby enhance the optical fiber color. For example, the perlescent pigment produces: a better slate when combined with a black dye; a better rose, when combined with a red dye; and a better aqua, when combined with a light blue dye. Again, as above, the inclusion of the perlescent pigments along with the dyes gives an increased UV transmittability and, therefore, a faster cure speed.

Although specific embodiments of the invention have been described above, it is contemplated that numerous modifications may be made to the fiber optic polymer coatings of the present invention without departing from the spirit and scope of the invention as defined in the following claims.

I claim:

1. An optical fiber comprising:
   a core;
   a cladding surrounding said core; and
   a polymer coating surrounding said cladding,
   wherein said polymer coating includes (1) a perlescent pigment and (2) one of a dye and a UV blocking pigment therein.

2. The optical fiber according to claim 1, wherein said perlescent pigment includes mica particles.

3. The optical fiber according to claim 2, wherein said mica particles are coated with a form of $TiO_2$.

4. The optical fiber according to claim 3, wherein said form of $TiO_2$ is rutile.

5. The optical fiber according to claim 3, wherein said form of $TiO_2$ is anatase.

6. The optical fiber according to claim 2, wherein said mica particles have an average width of from 1 μm to 15 μm.

7. The optical fiber according to claim 2, wherein said mica particles have an average width of from 1 μm to 10 μm.

8. The optical fiber according to claim 2, wherein said mica particles have an average width of 8 μm.

9. The optical fiber according to claim 1, wherein said polymer coating comprises a radiation curable polymer.

10. The optical fiber according to claim 1, wherein said polymer coating includes a primary coating surrounding said cladding and a secondary coating surrounding said primary coating, and wherein (1) said perlescent pigment and (2) said one of a dye and a UV blocking pigment are disposed in said secondary coating.

11. A fiber optic ribbon comprising:

a matrix material; and one or more optical fibers disposed in said matrix material, wherein said matrix material includes (1) a perlescent pigment and (2) one of a dye and a UV blocking pigment therein.

12. The fiber optic ribbon according to claim 11, wherein said perlescent pigment includes mica particles.

13. The fiber optic ribbon according to claim 12, wherein said mica particles are coated with $TiO_2$.

14. The fiber optic ribbon according to claim 13, wherein said $TiO_2$ is rutile.

15. The fiber optic ribbon according to claim 13, wherein said $TiO_2$ is anatase.

16. The fiber optic ribbon according to claim 12, wherein said mica particles have an average width of from 1 μm to 15 μm.

17. The fiber optic ribbon according to claim 12, wherein said mica particles have an average width of from 1 μm to 10 μm.

18. The fiber optic ribbon according to claim 12, wherein said mica particles have an average width of 8 μm.

19. The fiber optic ribbon according to claim 11, wherein said matrix material comprises a radiation curable polymer.

20. An optical fiber comprising:

a core;

a cladding surrounding said core;

a polymer coating surrounding said cladding; and an ink layer surrounding said polymer coating, wherein said ink layer includes (1) a perlescent pigment and (2) one of a dye and a UV blocking pigment therein.

* * * * *